United States Patent
Connelly et al.

(10) Patent No.: US 7,640,015 B2
(45) Date of Patent: Dec. 29, 2009

(54) TOOLS, METHODS AND SYSTEMS OF STORING REMOTELY AND RETRIEVING DETAIL RECORDS GIVEN A SPECIFIC CALL OR DATA SESSION

(75) Inventors: Stephen Philip Connelly, Reston, VA (US); Scott Alan Blomquist, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 588 days.

(21) Appl. No.: 11/127,260

(22) Filed: May 12, 2005

(65) Prior Publication Data

US 2006/0258339 A1 Nov. 16, 2006

(51) Int. Cl.
*H04W 24/00* (2009.01)

(52) U.S. Cl. .................. 455/423; 455/405; 455/408; 455/67.11; 455/406; 379/133; 379/114.03; 379/115.01

(58) Field of Classification Search .............. 455/414.1, 455/403–408, 423, 67.11; 379/133, 134, 379/115.01, 126–127.05; 702/84; 705/39; 370/352

See application file for complete search history.

(56) References Cited

U.S. PATENT DOCUMENTS

| | | | | |
|---|---|---|---|---|
| 4,442,321 A | * | 4/1984 | Stehman | 379/221.14 |
| 5,233,642 A | * | 8/1993 | Renton | 455/405 |
| 5,726,914 A | * | 3/1998 | Janovski et al. | 702/84 |
| 5,999,604 A | * | 12/1999 | Walter | 379/133 |
| 6,011,788 A | * | 1/2000 | Hurst et al. | 370/335 |
| 6,064,881 A | | 5/2000 | Shea et al. | |
| 6,327,350 B1 | * | 12/2001 | Spangler et al. | 379/115.01 |
| 6,359,976 B1 | * | 3/2002 | Kalyanpur et al. | 379/134 |
| 6,658,099 B2 | * | 12/2003 | Perkins, III | 379/112.01 |
| 6,721,284 B1 | * | 4/2004 | Mottishaw et al. | 370/255 |
| 6,801,607 B1 | * | 10/2004 | Marchand et al. | 379/114.14 |
| 6,876,731 B2 | * | 4/2005 | Cerami et al. | 379/126 |
| 7,155,205 B2 | * | 12/2006 | Cerami et al. | 455/406 |
| 7,336,941 B1 | * | 2/2008 | Clingerman et al. | 455/404.1 |
| 7,366,493 B2 | * | 4/2008 | Marsh et al. | 455/405 |
| 2002/0009182 A1 | | 1/2002 | Perkins, III | |
| 2002/0094070 A1 | * | 7/2002 | Mott et al. | 379/133 |
| 2003/0137975 A1 | * | 7/2003 | Song et al. | 370/353 |
| 2004/0128240 A1 | * | 7/2004 | Yusin | 705/39 |
| 2004/0252818 A1 | | 12/2004 | Liu | |
| 2005/0287983 A1 | * | 12/2005 | Armanino et al. | 455/405 |

FOREIGN PATENT DOCUMENTS

| EP | 948165 A1 | * 10/1999 |
|---|---|---|
| WO | WO 02/071780 A3 | 9/2002 |
| WO | WO 03/079651 A1 | 9/2003 |

* cited by examiner

*Primary Examiner*—Sharad Rampuria

(57) ABSTRACT

Systems and methods are provided for the management and analysis of detail records in a mobile telephony network, including the ability to store remotely and retrieve detail records given a specific call or a data session for signaling analysis in such networks. Computer program products which can execute such methods are also provided.

21 Claims, 7 Drawing Sheets

FIG. 2A

TOOLS, METHODS AND SYSTEMS OF STORING REMOTELY AND RETRIEVING DETAIL RECORDS GIVEN A SPECIFIC CALL OR DATA SESSION

BACKGROUND

Telecommunications networks, such as wireless, wireline and data communication networks, are widely used to link various types of nodes, such as personal computers, servers, gateways, network telephones, and so forth. Networks may include private networks, such as local area networks (LANs) and wide area networks (WAN), and public networks, such as the Internet. Such networks can also be circuit-switched networks in which network resources are dedicated for the entire duration of a data call, and/or packet-switch networks, such as Internet Protocol (IP) networks in which network resources are shared and data in the form of packets or cells are routed independently across the networks along with other user traffic to a destination. Examples of packet-switched networks include Asynchronous Transfer Mode (ATM) networks, Ethernet or Frame Relay, which are based on a virtual circuit model. Popular forms of communications across such networks include electronic mail, file transfer, web browsing, and other exchange of digital data including audio (e.g., voice) and multimedia (e.g., audio and video).

Modern telecommunications networks typically include two related but separate network infrastructures: a bearer or transmission network for carrying end-user voice and data traffic, and a signaling network for controlling the setup and release of bearer channels through the bearer network in accordance with control signals transferred through the signaling network. In practice, such signaling networks comprise high-speed computers interconnected by signaling links, and computer programs implemented to provide a set of operational and signaling functions in accordance with a standardized protocol, such as, for example, the Signalling System No. 7 (SS7) which is being extensively deployed for control of mobile telephony and other data transmission networks. The signaling links are used for passing signaling information (e.g., messages) between nodes in the signaling networks. The signaling information (e.g., messages) can be captured to generate detail records, such as, Call Detail Records (CDRs) or Transaction Detail Records (TDRs) for storage in a database system which can be subsequently monitored and analyzed for a wide variety of applications, including, for example, quality of service applications and business intelligence applications. In addition to the detail records, other related information sent between nodes, switches or devices in such mobile networks can also be used for authentication, equipment identification and roaming enablement.

Commercially available tools for mobile telephony networks may be used for monitoring the performance (or quality) of a network based on the detail records stored in the database system to observe possible obstacles and track performance statistics in the network. Typically, such monitoring tools are based on monitoring the network for malfunctions at the level of network elements, such as, switches or interfaces, for traffic-related information. However, such actions will result in the collection of vast amounts of data, which cannot be processed in real-time due to the size. Consequently, information from the vast amount of collected data can only be revealed to a network administrator or service personnel only after a certain period of time. For purposes of monitoring a network to detect malfunctions in real-time, such monitoring tools are not very useful. Moreover, the vast amount of collected data also requires large investment regarding large storage facilities and computational processing power. Furthermore, the detail records, such as Call Detail Records (CDRs) contain only a specific subset of information which can only be analyzed for limited diagnostic applications. As a result, a more comprehensive detail signaling analysis may not be available.

Accordingly, there is a need for improved tools, systems and methods for monitoring the quality of telecommunications networks and controlling the management and analysis of detail records in such networks, including, for example, the ability to store remotely and retrieve detail records given a specific call or a data session for signaling analysis in such networks.

SUMMARY

Various aspects and example embodiments of the present invention advantageously provide tools, systems and methods for the management and analysis of detail records in a mobile telephony network.

In accordance with an aspect of the present invention, a call manager system for use in a mobile telephony network is provided with a data record generator arranged to receive an incoming data stream in a series of individual frames representing calls occurring on the mobile telephony network, store individual frames in a file repository, and generate call data records (CDRs) corresponding to the calls; and a call manager arranged to manage the storage and retrieval of CDRs to/from a CDR repository, including user selection of CDRs of a specific type of calls and execution of a "drill-down" operation in which details of individual frames that make up a selected call can be drilled down from the file repository, upon request from a user input, for detailed data analysis that is not available based on CDRs. Such a detailed signal analysis may include, for example, a report of a time based sequence of events that can be inspected for potential errors at specific times, a confirmation of the CDR to ensure its accuracy, and a report of individual common measurements (which are messages sent every N seconds, to indicate signal characteristics such as signal strength) that can be inspected for signal characteristics.

The user input may correspond to a graphical user interface (GUI) which enables a user to review calls being transported on the mobile telephony network, to make selection regarding the specific type of calls for retrieval of all CDRs associated with the selected call from the CDR repository for initial signaling analysis, and to request for execution of the "drill-down" operation in which detailed frame messages corresponding to one or more selected CDRs can be retrieved for detailed signaling analysis. The data record generator can package individual frames that make up a call in a data file for storage in the file repository. Each CDR retrieved from the CDR repository may contain a file/call ID used to access the file repository for retrieval of a corresponding data file from the file repository.

The call manager can also be configured to function as a CDR filter mechanism for providing "real-time" filtering and matching of calls to user defined call criteria to select the type of calls that are of interest, and to function as a notification mechanism for providing notification and transportation to the CDR repository of triggered alarms and associated CDRs, when the calls occurring on the mobile telephone network match the user defined call criteria.

In accordance with another aspect of the present invention, a method of monitoring a mobile telephony network for data analysis is provided with the following: receiving individual frame messages representing calls from the mobile telephony network; packaging individual frame messages as data files for storage in a file repository, and generating call data records (CDRs) corresponding to the calls for storage in a CDR repository; obtaining all CDRs associated with a particular call ID from the CDR repository, upon a request from a user, for initial data analysis; selecting one or more CDRs associated with the particular call ID for detailed data analysis; and obtaining detailed frame messages corresponding to one or more selected CDRs associated with the particular call ID from the file repository for detailed data analysis. The CDRs associated with the particular call ID can be obtained directly from the CDR repository, via a user input of defined call criteria, or alternatively, automatically from the CDR repository, after the CDRs associated with the particular call ID have been filtered in advance, via user defined call criteria. The user request can be input, via a graphical user interface (GUI), to specify the type of calls for retrieval of all CDRs associated with the selected call ID from the CDR repository for initial signaling analysis and to request execution of the "drill-down" operation in which detailed frame messages corresponding to one or more selected CDRs are retrieved for detailed signaling analysis that is not available based on CDRs. Such a detailed signal analysis may include, for example, a report of a time based sequence of events that can be inspected for potential errors at specific times, a confirmation of the CDR to ensure its accuracy, and a report of individual common measurements (which are messages sent every N seconds, to indicate signal characteristics such as signal strength) that can be inspected for signal characteristics.

In accordance with yet another aspect of the present invention, a computer readable medium is provided with instructions that, when executed by a computer system, perform the method comprising: receiving individual frame messages representing calls from the mobile telephony network; packaging individual frame messages as data files for storage in a file repository, and generating call data records (CDRs) corresponding to the calls for storage in a CDR repository; obtaining all CDRs associated with a particular call ID from the CDR repository, upon a request from a user, for initial data analysis; selecting one or more CDRs associated with the particular call ID for detailed data analysis; and obtaining detailed frame messages corresponding to one or more selected CDRs associated with the particular call ID from the file repository for detailed data analysis.

In accordance with another aspect of the present invention, a computer readable medium is provided with a program for execution by a host computer, which comprises a data record generator routine configured to receive an incoming data stream in a series of individual frames representing calls occurring on the mobile telephony network, to store individual frames in a file repository, and to generate call data records (CDRs) corresponding to the calls; and a call manager routine configured to manage the storage and retrieval of CDRs to/from a CDR repository, including user selection of CDRs of a specific type of calls and execution of a "drill-down" operation in which details of individual frames that make up a selected call can be drilled down from the file repository, upon request from a user input, for detailed data analysis.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIGS. 2A-2B illustrate example Call Detail Records (CDRs) obtained from different links in the mobile telephone network shown in FIG. 1;

DETAILED DESCRIPTION

Figure 1:
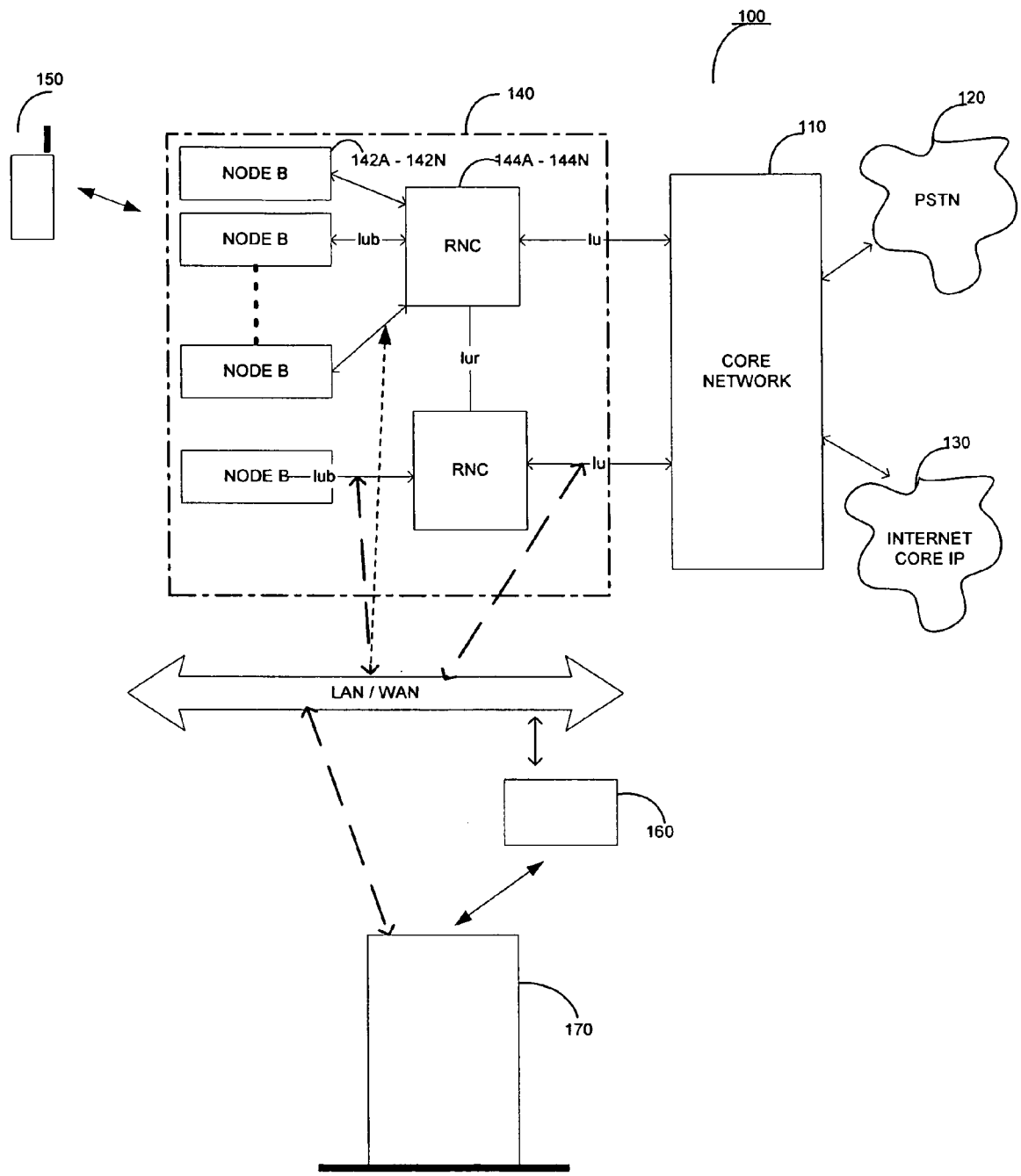
FIG. 1 illustrates an example mobile telephony network and monitor systems used for signaling analysis of the mobile telephony network.

Before beginning a detailed description of the subject invention, mention of the following is in order. When appropriate, like reference numerals and characters may be used to designate identical, corresponding or similar components in differing figure drawings. Further, in the detailed description to follow, example sizes/values/ranges may be given, although the present invention is not limited to the same. The present invention is also applicable for use with all types of telecommunication networks, including, for example, an Integrated Systems Digital Network (ISDN), a Voice over IP (VoIP) network, the Internet, or mobile telephony networks (e.g., based on Telecommunications Industry Association (TIA)/Electronics Industries Alliances (EIA) standards, such as IS-95, IS-856 or IS-2000), such as a Time Division Multiple Access (TDMA) network, a Code Division Multiple Access (CDMA) network, a Wideband Code Division Multiple Access (W-CDMA) network, a Global System for Mobile communication (GSM) network, a General Packet Radio Service (GPRS) network, or a Universal Mobile Telecommunications System (UMTS) network, and the next generation of wireless networks which may become available as technology develops, including CDMA technologies for wireless data services and applications, such as wireless email, web, digital picture taking/sending and assisted-GPS position location applications, and compatible network protocols, such as hyper text transfer protocols (HTTP), file transfer protocols (FTP), VoIP protocols, and UMTS protocols as defined by 3GPP group (see http://www.3gpp.org).

However, for the sake of simplicity, discussions will concentrate mainly on exemplary use of an UMTS mobile network, although the scope of the present invention is not limited thereto.

Attention now is directed to the drawings and particularly to FIG. 1, in which an example a mobile telephony network, such as an universal mobile telecommunications system (UMTS) network is illustrated. As shown in FIG. 1, the mobile telephony network 100 includes a core network 110 which supports circuit-switched networks such as a public switch telephone network (PSTN) 120, and/or packet-switched networks such as Internet Core IP 130; a radio access network 140 connected to the core network 110 to support communications with a user equipment (UE) 150 which is typically a mobile phone, a video phone or a personal digital assistant (PDA). Typically, the core network 110 contains a mobile switching center (MSC) (not shown) supporting communications, via the circuit switched networks such as PSTN 120, and one or more support nodes (not shown) providing a gateway to the packet-switched networks such as Internet core IP 130 and controlling the connection between the network and the user equipment (UE) 150 for wireless communications. The radio access network 140 includes one or more nodes "B", also known as base stations, 142A-142N, and one or more radio network controllers (RNCs) 142A-142N connected to the localized group of nodes 142A-142N to select the most appropriate node for the user equipment (UE) 150 and perform handover during wireless communications, when necessary. Network architecture and implementation of the UMTS network 100, including backbone ATM switches, interfaces such as "Iu" disposed between the RNCs 144A-144N and the core network 110, "Iur" disposed between the RNCs 144A-144N, "Iub" disposed between the RNCs 144A-144N and the corresponding nodes 142A-142N, signaling links between nodes and network elements within the UMTS network 100, and signaling information passing between the signaling links are well-known and, as a result, need not be described in detail herein. However, for purposes of brevity, the signaling information represents data regarding the establishment, control and management of functions of the network 100. Detail records, such as, Call Detail Records (CDRs) of a specific call or Transaction Detail Records (TDRs) of a specific data session can be constructed from signaling information transmitted between signaling links within the mobile telephony network 100. The terms "CDR" and "TDR" may be seen interchangeable in the context of a mobile telephony network 100 disclosed herein. Similarly, the terms "call" and "data session" can also be used interchangeably, and can be broadly described simply as "transaction".

Typically, CDRs may have different structures or formats in the telecommunication industry each containing different types of information depending on what the CDRs will be used for, including, for example, defining telephone calls originating on land-line telephones, telephone calls terminating on land-line telephones and telephone calls terminating on mobile telephones. However, for purposes of simplicity, CDRs as referred herein shall represent generic CDRs. The term "CDR" refers generally to any electronic record of the details of a call, including, for example, originating number, terminating number, time, duration etc. Specifically, each CDR may correspond to a collection of messages comprising parameters and time-stamps associated with each call which provide detail regarding the call origin, destination, and other details. The parameters and time-stamps associated with each message or collection of information referred to as the "CDR" are the primary pieces of information needed to determine who called whom, how the call was routed and the call disposition for signaling analysis. These CDRs can be monitored and analyzed for a wide variety of applications, including, for example, quality of service applications and business intelligence applications, such as service assurance, fraud detection, fulfillment and billing applications.

As shown in FIG. 1, a monitoring system 160 can be configured to capture traffic, including signaling data, on key interfaces, including, for example, "Iub" interfaces and "Iu" interfaces, or other signaling links, within the mobile telephony network 100 for signaling analysis of the mobile telephony network 100. Such a monitoring system 160 can be coupled to interfaces, such as "Iub" interfaces connecting one of the RNCs 144A-144N to at least one node 142A-142N, or "Iu" interfaces connecting the RNCs 144A-144N to the core network 110, or ATM switches, either directly, or via a local or wide area network (LAN/WAN), to capture signaling data at a particular interface or signaling link and provide captured signaling data for analysis or collection by a computer (database) system 170. The monitoring system 160 may be, for example, AGILENT™ G6801A Distributed Network Analyzer (DNA) used for capturing all signaling data from a particular signaling link (i.e., interface within the mobile telephony network 100) that relates to a single call or data session, for example, and for controlling the distribution of the signaling data for real-time network testing and analysis, including diagnostics of quality of services and troubleshooting. In addition, software applications, such as AGILENT™ J7326A Signaling Analyzer software (SAS), can be also be installed on the computer system 170, which can be an independent server or host computer system, to decode and analyze captured signaling data locally, with a real-time display. The SAS can also be stored on the monitoring system 160 or any computing system, such as an external PC, a laptop, or a server coupled to a local area network (LAN). The captured signaling data can represent a large number of calls/sessions and can be visually displayed, via a user-configurable window or table format, so that a user (i.e., network administrator or maintenance personnel) can trace each call that has occurred or is occurring on the mobile telephony network 100.

Typically, the monitoring system 160 creates Detail Records, such as CDRs, which are assembled by piecing together individual frames of incoming data stream that are being transported across the mobile telephony network 100. These CDRs can then be displayed, for example, at the computer system 170 and, alternatively, can be saved for later signaling analysis, potentially leaving a long time before signaling analysis can be realized and remedial actions can be taken in response to the signaling analysis. However, when viewing calls within the monitoring system 160 and/or the computer system 170 in real-time, the user (i.e., network administrator or maintenance personnel) can be overwhelmed with the deluge of calls that can take place within the mobile telephony network 100.

Figure 2A:
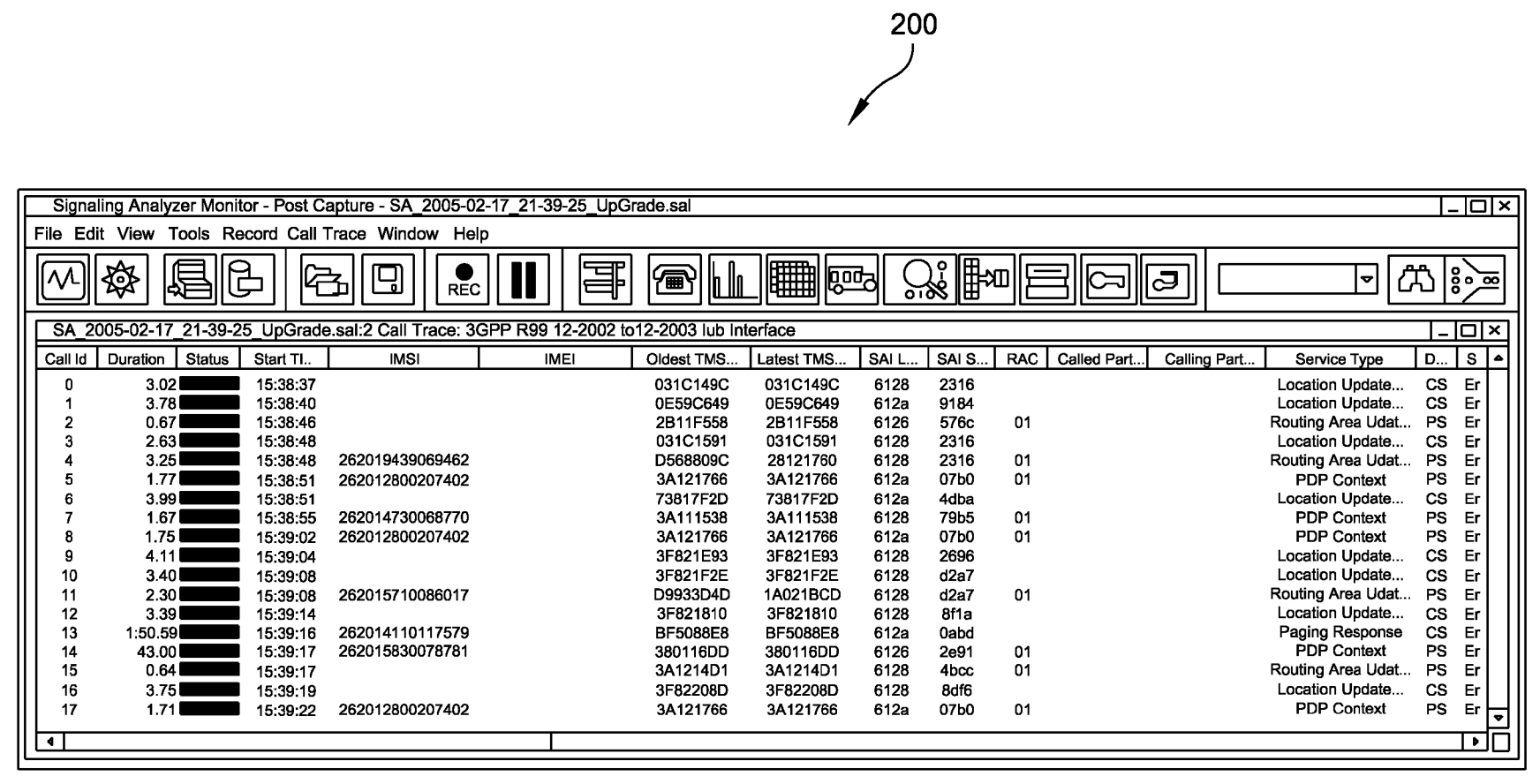
Figure 2B:
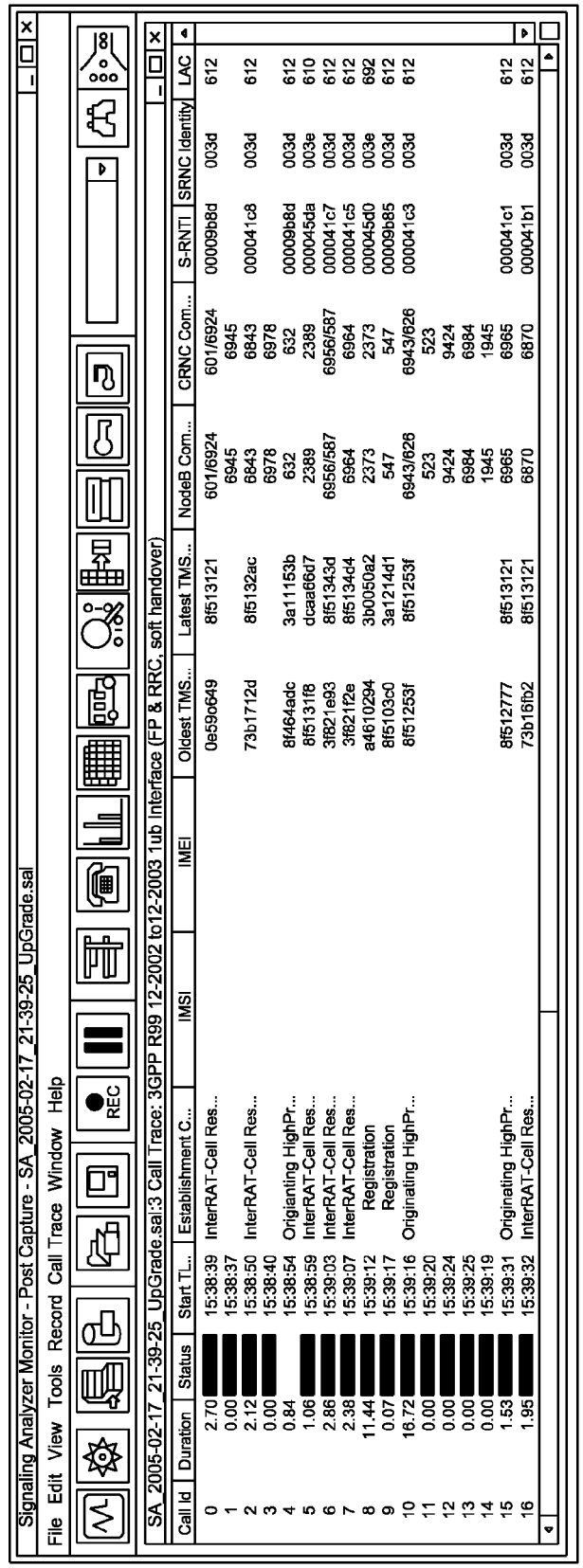

For example, FIGS. 2A-2B illustrate a visual display of different types of Call Detail Records (CDRs) obtained from different signaling links (monitor points, such as interfaces or switches) in the mobile telephone network 100 on a computer system 170. Specifically, FIG. 2A illustrates a visual display of example CDRs obtained from an "Iu" interface disposed between the RNCs 144A-144N of the radio access network (RAN) 140 and the core network 110 of the mobile telephony network 100. Alternatively, FIG. 2B illustrates a visual display of example CDRs obtained from an "Iub" interface disposed between the RNCs 144A-144N and the corresponding nodes 142A-142N of the radio access network (RAN) 140 of the mobile telephony network 100.

As shown in FIG. 2A and FIG. 2B, each row in the display on the database system 170 represents a call that has occurred or is occurring on the mobile telephony network 100. Each column contains parameters that are particular for a specific call trace which may indicate specific problems. The parameters utilized for an "Iu" interface, as shown in FIG. 2A, may include, for example, Call ID, Duration, Status, Start Time, Establishment Cause, IMSI, IMEI, Oldest TMSI/P-TMSI, Latest TMSI/P-TMSI, SAI LAC, SAI SAC, RAC, Called Party BCD Number, Calling Party BCD Number, Service Type, Domain, SCCP Release Cause, RANAP Cause, Setup Time, Cleardown Time, Speech Path/CID, Bad Speech Frames, IPv4 Address, Uplink Packets, Downlink Packets, Uplink Octets, Downlink Octets, Uplink Rate bp/s, and Downlink Rate bp/s. Similarly, the parameters utilized for an "Iub" interface, as shown in FIG. 2B, may include, for example, Call ID, Duration, Status, Start Time, Establishment Cause, IMSI, IMEI, Oldest TMSI/P-TMSI, Latest TMSI/P-TMSI, Node B CommCtx ID, CRNC CommCtx ID, S-RNTI, SRNC Identity, LAC, RAC, Cell Identifier, Service Type, Domain, SCCP Release Cause, RANAP Cause, Setup Time, Cleardown Time, Speech Path/CID, Bad Speech Frames, IPv4 Address, Uplink Packets, Downlink Packets, Uplink Octets, Downlink Octets, Uplink Rate bp/s, and Downlink Rate bp/s.

"Call ID" may represent a unique identifier of a specific call; "Duration" may represent a duration of the completed call; "Status" may represent whether a call is active or terminated. "Start Time" may represent the start time of the call; "IMSI" may represent an International Mobile Subscriber Identity of a subscriber initiating the call; "IMEI" may represent an International Mobile Equipment identify of equipment manufacturers; "Oldest TMSI/P-TMSI" may represent a Temporary Mobile Subscriber Identity (TMSI) and the packet TMS; "Latest TMSI/P-TMSI" may represent the latest TMSI and the packet TMSI; "SAI LAC" may represent a Service Area Identifier of the Location Area Code; "SAI SAC" may represent a Service Area Identifier of the Routing Area Code; "Called Party BCD Number" may represent a Called Party Binary Coded Decimal Number; "Calling Party BCD Number" may represent a Calling Party Binary Coded Decimal Number; "Node B CommCtx ID" may represent an identifier of the Communication Context in the Node B; "CRNC CommCtx ID" may represent an identifier of the Communication Context of the Node B in the Radio Network Controller (RNC); "S-RNTI" may represent a serving Radio Network Temporary Identity; "SRNC Identity" may represent a serving Radio Network Controller Identity; "LAC" may represent a Location Area Code which identifies a location area within the mobile network 100; "RAC" may represent a Routing Area Code within a location area; "Cell Identifier" may represent an identifier of a cell in one Radio Network Controller (RNC); "Service Type" may represent a type of service that occurred during the duration of a call; "Domain" may represent a type of network in which a call is transmitted: Circuit Switched (CS) or Packet Switched (PS); "Release Cause" may represent a criteria for the call to be released; "RANAP Cause" may represent text description of a cause; "Setup Time" may represent a time taken to set up a call or session; "Cleardown Time" may represent a time taken to clear down a call or session; "Speech Path/CID" may represent VCI/CID that is used for the call; "Bad Speech Frames" may represent a count of the number of bad speech frames that were detected during a call which indicates the level of quality of voice calls during a call; "IPv4 Address" may represent the Internet Protocol Version #4 address; "Uplink Packets" may represent a count of the number of IP packets that the user equipment (UE) has sent to the mobile network 100 during a data session; "Downlink Packets" may represent a count of the number of IP packets that the user equipment (UE) 110 has received from the mobile network 100 during a data session; "Uplink Octets" may represent the count of the number of IP octets that the user equipment (UE) 110 has sent to the mobile network 100 during a data session; "Downlink Octets" may represent a count of the number of IP packets that the user equipment (UE) has received from the mobile network 100 during a data session; "Uplink Rate bp/s" may represent the average data transfer rate in bits/second that the user equipment (UE) 110 has experienced while sending data to the mobile network 100; and "Downlink Rate bp/s" may represent an average data transfer rate in bits/second that the user equipment (UE) 110 has experienced while receiving data from the mobile network 100.

As can be seen from FIGS. 2A-2B, calls and call ID variables obtained from different signaling links (i.e., interfaces) in the mobile telephony network 100 can be different; nevertheless, these calls may have common characteristics such as: Call Type; Start Time; End Time; Successful; or Failure Reason, all of which (whether from one or more signaling links) can be analyzed to identify and pinpoint problems in the mobile telephony network 100. Nevertheless, the user has to sift through the high volume of calls being transported on the mobile telephony network 100 and viewed, for example, on the database system 170. As a result, such a review can be overwhelming, whether the calls obtained are from a single signaling link or different signaling links. Moreover, when problems are identified, CDRs obtained from the monitoring system 160 contain only a limited subset of information, which, in turn, only can only be analyzed for limited problems. Therefore, it is important to provide a user (i.e., a network administrator or maintenance personnel) with improved tools, systems and methods for the management and analysis of detail records in such a mobile telephony network 100, including the ability to filter all calls occurring in the mobile telephony network 100 for a specific type of calls that are of interest, such as, for example, only failed calls, the ability to store remotely and retrieve CDRs given a specific call or data session, and the ability to view the complete frame level detail of the actual CDR for specific signaling analysis in such a mobile telephony network 100.

Figure 3:
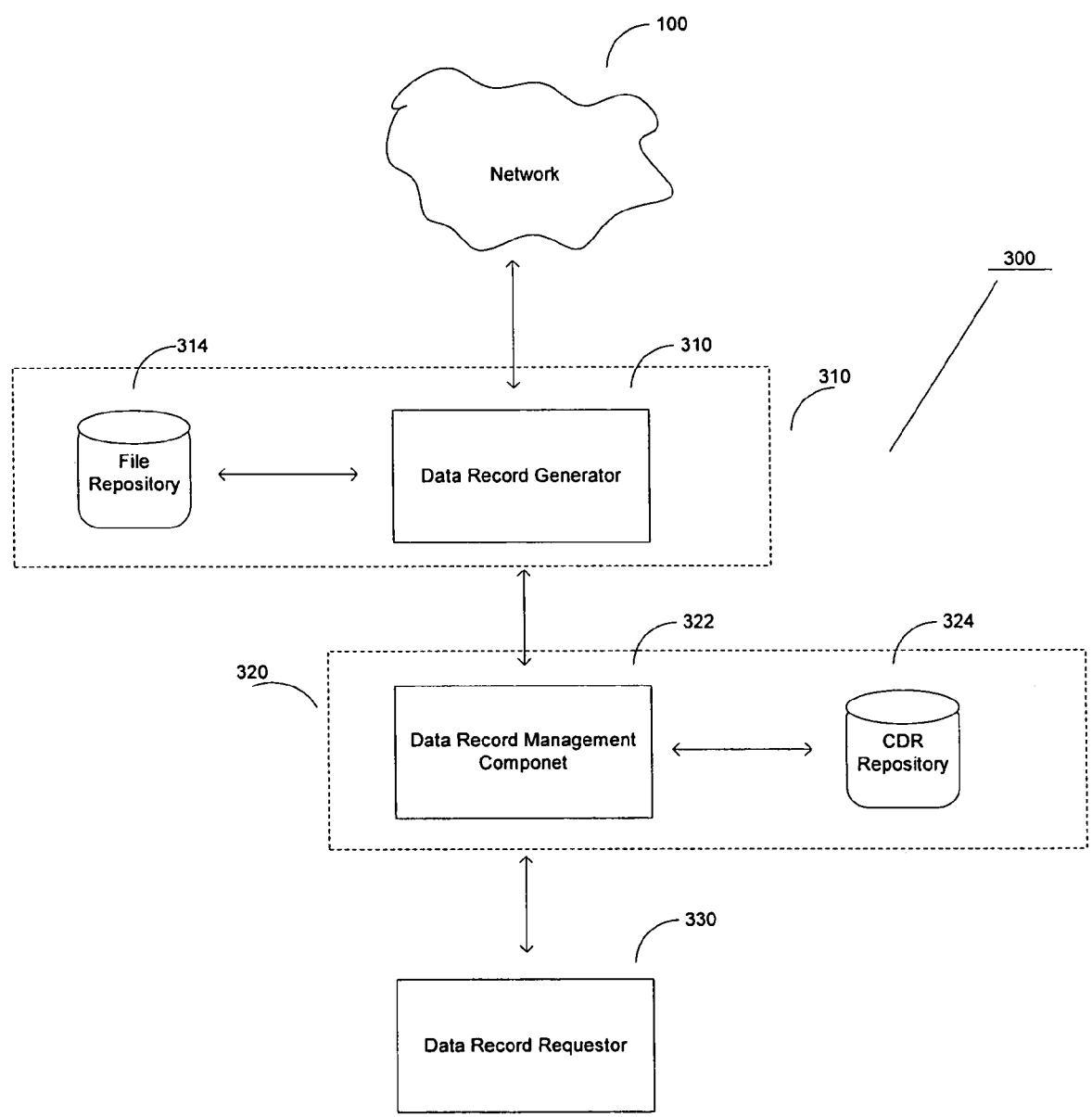
FIG. 3 illustrates an example Call Manager system according to an embodiment of the present invention.

Turning now to FIG. 3, an example of the Call Manager system 300 according to an embodiment of the present invention is illustrated. As shown in FIG. 3, the Call Manager system 300 comprises three elements: a Call Manager Flow Client 310 which receives an incoming data stream made of individual frames (messages) that make up each call from a signaling link (i.e., interface or switch) within a mobile telephony network 100, and, upon receipt of the incoming data stream, stores individual frames of raw data in data files (e.g., SAL files) provided with a file directory, and then generates data records such as CDRs corresponding to the calls that are being transported across the mobile telephony network 100; a Call Manager 320 which manages the storage and retrieval of CDRs, and individual frames of corresponding CDRs stored at the Call Manager Flow Client 310, including selecting a specific type of calls that are of interest and executing a "drill-down" operation in which details of individual frames that make up the selected call can be drilled down from the Call Manager Flow Client 310 upon request by a user (i.e., network administrator or maintenance personnel); and a Call Manager Requestor (client input) 330 which enables the user to review calls being transported on the mobile telephony network 100, to make selection regarding the type of calls that are of interest for retrieval of all CDRs associated with the selected call for signaling analysis, and to request for execution of the "drill-down" operation in which detailed frame messages corresponding to one or more selected CDRs can be retrieved for a visual display for detailed signaling analysis. Such a detailed signal analysis may include, for example, a report of a time based sequence of events that can be inspected for potential errors at specific times, a confirmation of the CDR to ensure its accuracy, and a report of individual common measurements (which are messages sent every N seconds, to indicate signal characteristics such as signal strength) that can be inspected for signal characteristics. This type of detailed signal analysis can only be completed based on raw frame messages, and not based on the CDRs.

The Call Manager Flow Client 310, the Call Manager 320 and the Call Manager Requestor 330 can be software modules written, via a variety of software languages, including C, C++, Java, Visual Basic, and many others. The various software modules may also be integrated in a single application executed on one or more control units (not shown), such as a microprocessor, a microcontroller, or a processor card (including one or more microprocessors or microcontrollers) in the computer system 170, for example, as shown in FIG. 1. Alternatively, the software modules can also be distributed in different applications executed by different computing systems, such as the monitoring system 160, the computer system 170, or any other computing devices connected to the mobile telephony network 100. For example, the Call Manager Flow Client 310 may reside on the monitoring system 160, as shown in FIG. 1. The Call Manager 320 may reside on the computer system 170. Similarly, the Call Manager Requestor 330 may reside on the same computer system 170, or alternatively, another computing device, such as an external PC, a laptop, or a server coupled to a local area network (LAN). Alternatively, components of the Call Manager Flow Client 310, the Call Manager 320 and the Call Manager Requestor 330 can also be integrated in a single application which can be installed at a single computing device, such as the computer system 170, as shown in FIG. 1.

These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs).

Instructions of the software routines or modules may also be loaded or transported into the monitoring system 160, the computer system 170 or any computing devices on the mobile telephony network 100 in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

Referring back to FIG. 3, the Call Manager Flow Client 310 includes a data record generator 312 and an internal database, known as a file repository 314. The data record generator 312 is arranged to receive an incoming data stream made up of individual frames (messages) which represent calls that have occurred or are occurring on the telephony network 100, to package individual frames or messages that make up each call in a separate and discrete data file, known as SAL files, to store packaged data files in the file repository 314, and then generate data records such as CDRs corresponding the calls that have occurred or are occurring on the telephony network 100.

The Call Manager 320 includes a data record management component (DRMC) 322 and an internal database, known as a CDR repository 324. The data record management component (DRMC) 322 can be configured to receive and store the CDRs received from the data record generator 312 into the CDR repository 324, and to retrieve one or more CDRs from the CDR repository 324 associated with a particular call ID (e.g., IMSI) for a visual display, upon request from the Call Manager Requestor 330. The data record management component (DRMC) 322 can also be configured to receive a request from the Call Manager Requestor 330 to perform a "drill-down" operation in which details of individual frames stored in the file repository 314 that make up the selected call can be drilled down from the file repository 314 for a visual display at the Call Manager Requestor 330 for detailed signaling analysis. The Call Manager Requestor 330 can be an intuitive graphical user interface (GUI) to facilitate clarity and easiness of use for user input.

Figure 4:
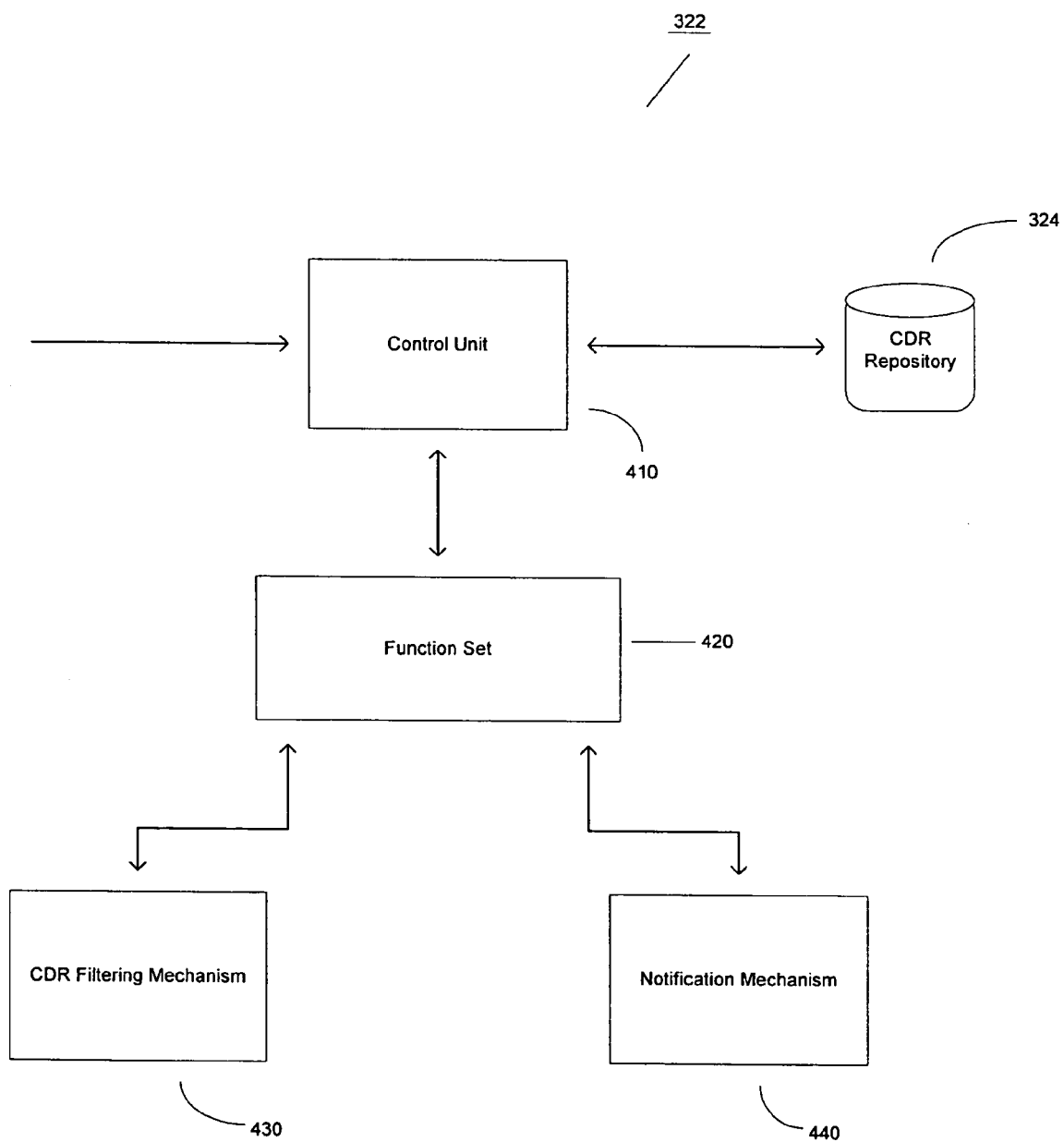
FIG. 4 illustrates an example data record management component according to an embodiment of the present invention.

Such a data record management component (DRMC) 322 can also be a control unit 410, as shown in FIG. 4, such as a microprocessor, a microcontroller, or a processor card installed, for example, in the computer system 170, shown in FIG. 1, which can be configured to perform a set of functions 420, including the management of the CDRs stored at the CDR repository 324 and individual frames of corresponding CDRs stored at the file repository 314, and the execution of the "drill-down" operation. The set of functions 420 can also include functions that are used to manage other aspects of the Call Manager system, including, for example, a CDR filtering mechanism 430 to provide "real-time" filtering and matching of calls to specific user defined call criteria for selecting the type of calls that are of interest, and a notification mechanism 440 to configure specific user define call criteria and alarms set by the user, via the Call Manager Requestor 330, and to provide the notification and transportation to the CDR repository 324 of the triggered alarms and associated CDRs.

For example, alarm criteria may include: Name of Alarm, Call Record Type, Criteria to match (i.e., logical expressions), Amount of times the criteria must match, Time period to perform the alarm, and Notification methods, such as, email notification, pager, text messaging, Simple Network Management Protocol (SNMP) Trap, or any combination thereof. These are not intended to be a limiting list because different users will want to specify different alarm criteria depending on what aspects of the mobile telephony network 100 that need to be monitored and reviewed. Other input mechanisms are possible such as an editable table, and defaults may be set so that a user does not need to specify all the data for the alarm criteria.

An example alarm can be configured to include the following: (1) Name of Alarm; (2) Call Record Type; (3) Criteria to match (Logical expressions can be used); (4) The amount of times this criteria must match; (5) Time period to perform the alarm. An example of user defined call criteria may be shown in the following Table 1 as follows:

TABLE 1

| Criteria | Value |
| --- | --- |
| Name of Alarm | "Iu" abnormal releases |
| Call Record Type | "Iu" Interface |
| Criteria to match | RANAP Cause = 'Abnormal Release' |
| The minimum of times this criteria must match | 10 |
| Time period to perform the alarm | 60 seconds |
| Notification | SNMP Trap |

For example, a CDR filtering mechanism 430, as shown in FIG. 4, may be configured to read the user defined call criteria from the CDR repository 324, and determine if the CDRs generated from the Call Manager Flow Client 310 match the corresponding user defined call criteria. If the CDRs generated from the Call Manager Flow Client 310 match the user defined call criteria, then selected CDRs can be stored in the CDR repository 324. This way, incoming CDRs can be parsed down to a usable size on a "real-time" basis so that only specific calls of interest may be recognized, and calls that are not of interest may be ignored or filtered out. The CDR filtering mechanism 430 is not protocol specific and, as a result, may handle many different types of protocols such as, for example, CDMA, CDMA 200, GSM, and GPRS. Once the calls of interest are recognized and filtered, via the CDR filtering mechanism 430, the notification mechanism 440 may be used to notify the user by way of example, email notification, pager, text messaging, Simple Network Management Protocol (SNMP) Trap, or any combination thereof. For example, the notification mechanism 440 may bundle together a message that ten (10) abnormal call terminations occurred in a 1 minute window at a certain time of day and transmit the bundled message to the user. Once notified, the user is then able to investigate the actual calls that triggered the notification and review one or more selected calls for signaling analysis. All alarms that have been triggered and calls associated with a triggered alarm may be stored in the CDR repository 324, and can be historically viewed and retrieved/deleted by the user, via the Call Manager Requestor 330.

Figure 5:
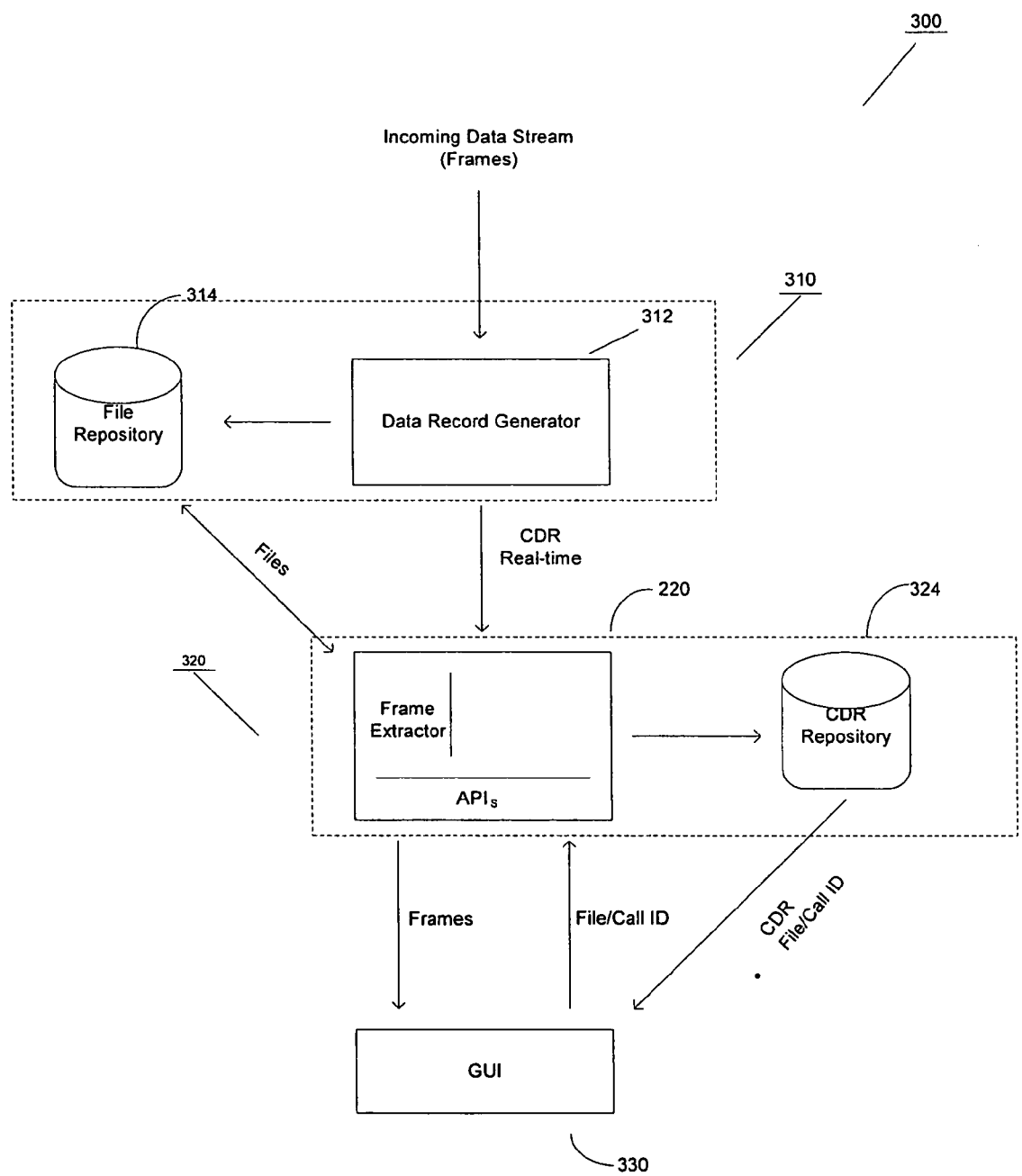
FIG. 5 illustrates an example interaction between components of the Call Manager system according to an embodiment of the present invention.

Turning now to FIG. 5, an example interaction between components of the Call Manager system according to an embodiment of the present invention is illustrated. As shown in FIG. 5, the data record management component 322 of the Call Manager 320 is provided with a plurality of I/O hardware application program interfaces (APIs) which enable the Call Manager Requestor 330 to request a "drill-down" operation, and an internal frame extractor which extracts original frame messages from a file retrieved from the file repository 314 during the "drill-down" operation for a visual display at the Call Manager Requestor 330. Typically, all CDRs of interest, generally associated with a particular call ID (e.g., IMSI) can be obtained from the CDR repository 324 in one of two ways: First, CDRs associated with a particular call ID can be obtained directly from the CDR repository 324, via user defined call criteria input at the Call Manager Requestor 330. Second, the same CDRs can also be obtained automatically from the CDR repository 324, via the CDR filtering mechanism 430, shown in FIG. 4. The CDRs of interest will have corresponding file IDs (i.e., directory locations of the file repository 314) which are subsequently used by the data record management component 322 of the Call Manager 320 to access the file repository 314 of the Call Manager Flow Client 310 to retrieve corresponding data files. The CDRs of interest, i.e., all CDRs of a particular call ID, can then be displayed in a window at the Call Manager Requestor 330, as shown, for example, in FIGS. 2A-2B, where the user can make selection of one or more CDRs for further detailed signaling analysis. If one or more CDRs of interest are selected, an API request containing a directory location and call ID will be issued at the Call Manager Requestor 330, for a SAL file containing the details of individual frames that pertain to a specific CDR. The data record management component 322 of the Call Manager 320 will search through the file repository 314 looking for a specific CDR so that a SAL file can be created and original individual frames that make up each call can be extracted from the SAL file for a visual display at the Call Manager Requestor 330 for detailed signaling analysis.

Figure 6:
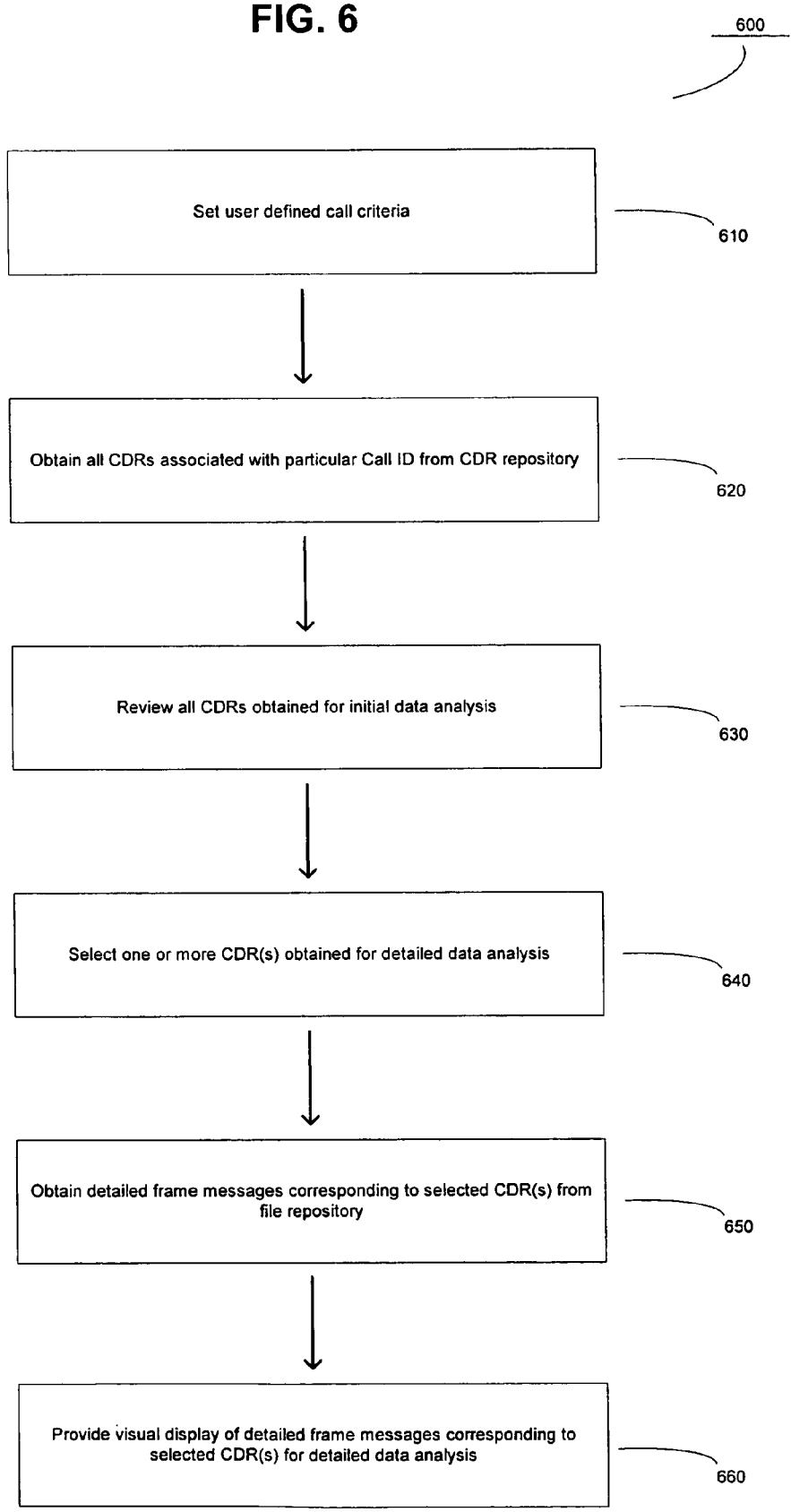
FIG. 6 illustrates an example flowchart of an example operation of the Call Manager system according to an embodiment of the present invention.

FIG. 6 illustrates an example flowchart of an example "drill-down" operation 600 of the Call Manager system according to an embodiment of the present invention. As shown in FIG. 6, the user at the Call Manager Requestor 330 sets user defined call criteria for obtaining CDRs of interest, i.e., all CDRs associated with a particular call ID (e.g., IMSI), at block 610. For example, all calls made by a specific user in the last 20 days can be requested at the Call Manager Requestor 330 for an initial data analysis. Such user defined call criteria can be set in real-time at the Call Manager Requestor 320, or alternatively, in advance with respect to the CDR filtering mechanism 430, shown in FIG. 4. The Call Manager Requestor 330 then obtains all CDRs associated with a particular call ID from the CDR repository 324 for a visual display, at block 620. The user at the Call Manager Requestor 330 reviews all CDRs obtained for initial data analysis, at block 630, and then selects one or more CDRs obtained for detailed data analysis, at block 640. As previously discussed, each CDR obtained from the CDR repository 324 contains a corresponding file/call ID. Once selected, the Call Manager Requestor 330 obtains detailed frame messages corresponding to the selected CDR(s) from the file repository 314, at block 650. Such detailed frame messages can be obtained by issuing an API request to the data record management component 322 of the Call Manager 320 so as to access the file repository 314 and retrieve one or more corresponding SAL files stored in the file repository 314. Once a SAL file is retrieved from the file repository 314, the data record management component 322 will extract individual frame messages from the SAL file using an internal frame extractor, as shown in FIG. 5, and transport detailed frame messages to the Call Manager Requestor 330. The Call Manager Requestor 330 then provides a visual display of detailed frame messages corresponding to the selected CDR(s) for detailed data analysis, at block 660. Each selected CDR and related detailed frame messages may be displayed in a unique window so that detailed data analysis can be performed.

As described from the foregoing, the present invention advantageously provides the user (i.e., network administrator or maintenance personnel) with improved tools, systems and methods for the management and analysis of detail records in such a mobile telephony network, including the ability to filter all calls occurring in the mobile telephony network for a specific type of calls that are of interest, such as, for example, only failed calls, the ability to store remotely and retrieve CDRs given a specific call or data session, and the ability to view the complete frame level detail of the actual CDR for detailed signaling analysis in such a mobile telephony network. Such a detailed signal analysis may include, for example, a report of a time based sequence of events that can be inspected for potential errors at specific times, a confirmation of the CDR to ensure its accuracy, and a report of individual common measurements (which are messages sent every N seconds, to indicate signal characteristics such as signal strength) that can be inspected for signal characteristics. This type of detailed signal analysis can only be completed based on raw frame messages, and not based on the CDRs.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the Call Manager system can be configured to include only the data record management component 322 in combination with the file repository 314 and the CDR repository 324, and can be implemented in a single application installed at any computing device. In addition, the mobile network has been described in the context of a telecommunications network having an architecture typical of North America, it should be appreciated that the present invention is not limited to this particular telecommunications network or protocol. Rather, the invention is applicable to other communications networks and compatible signalling protocols, for example an Integrated Systems Digital Network (ISDN), a Voice over IP (VoIP) network, the Internet, or a cellular communications system, such as TDMA, CDMA, W-CDMA, GSM or UMTS networks. Moreover, alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Lastly, both the file repository and the CDR repository can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Accordingly, it is intended, therefore, that the present invention not be limited to the various example embodiments disclosed, but that the present invention includes all embodiments falling within the scope of the appended claims.

What is claimed is:

1. A call manager system for use in a mobile telephony network, comprising:
   a data record generator arranged to receive an incoming data stream in a series of individual frames representing calls occurring on the mobile telephony network, store the individual frames as data files in a file repository, and generate call data records (CDRs) corresponding to the calls, the CDRs including a summary of information included in respective ones of the data files; and
   a call manager arranged to manage the storage and retrieval of CDRs to/from a CDR repository, including user selection of CDRs of a specific type of calls and execution of a "drill-down" operation in which details of the individual frames that make up a selected call can be drilled down from the file repository, upon request from a user input, for detailed data analysis.

2. The call manager system as claimed in claim 1, wherein the user input enables a user to review calls being transported on the mobile telephony network, make selection regarding the specific type of calls for retrieval of all CDRs associated with the selected call from the CDR repository for initial signaling analysis, and request for execution of the "drill-down" operation in which detailed frame messages corresponding to one or more selected CDRs can be retrieved for detailed signaling analysis.

3. The call manager system as claimed in claim 1, wherein the user input corresponds to a graphical user interface (GUI) which accepts inputs from the user to specify the type of calls for retrieval of all CDRs associated with the selected call from the CDR repository for initial signaling analysis and to request execution of the "drill-down" operation for a visual display of detailed frame messages corresponding to one or more selected CDRs for detailed signaling analysis.

4. The call manager system as claimed in claim 1, wherein the data record generator packages individual frames that make up a call in a data file for storage in the file repository.

5. The call manager system as claimed in claim 1, wherein each CDR retrieved from the CDR repository contains a file/call ID used to access the file repository for retrieval of a corresponding data file from the file repository.

6. The call manager system as claimed in claim 1, wherein the call manager is configured to function as a CDR filter mechanism for providing "real-time" filtering and matching of calls to user defined call criteria to select the type of calls that are of interest, and to function as a notification mechanism for providing notification and transportation to the CDR repository of triggered alarms and associated CDRs, when the calls occurring on the mobile telephone network match the user defined call criteria.

7. The call manager system as claimed in claim 6, wherein the user input corresponds to a graphical user interface (GUI) which accepts inputs from the user to set the user defined call criteria for retrieval of one or more CDRs associated with a particular call ID from the CDR repository for initial signaling analysis and to request retrieval of detailed frame messages corresponding to one or more selected CDRs for detailed signaling analysis.

8. A method of monitoring a mobile telephony network for data analysis, comprising:
   receiving individual frame messages representing calls from the mobile telephony network;
   packaging the individual frame messages as data files for storage in a file repository, and generating call data records (CDRs) corresponding to the calls for storage in a CDR repository, the CDRs including a summary of information included in respective ones of the data files;
   obtaining all CDRs associated with a particular call ID from the CDR repository, upon a request from a user, for initial data analysis;
   selecting one or more CDRs associated with the particular call ID for detailed data analysis; and
   obtaining detailed frame messages corresponding to one or more selected CDRs associated with the particular call ID from the file repository for detailed data analysis.

9. The method as claimed in claim 8, wherein all CDRs associated with the particular call ID are obtained directly from the CDR repository, via a user input of defined call criteria.

10. The method as claimed in claim 8, wherein all CDRs associated with the particular call ID are obtained automatically from the CDR repository, after the CDRs associated with the particular call ID have been filtered in advance, via user defined call criteria.

11. The method as claimed in claim 8, wherein the user request is input, via a graphical user interface (GUI), to specify the type of calls for retrieval of all CDRs associated with the selected call ID from the CDR repository for initial signaling analysis and to request execution of a "drill-down" operation in which detailed frame messages corresponding to one or more selected CDRs are retrieved for detailed signaling analysis.

12. The method as claimed in claim 8, wherein each CDR retrieved from the CDR repository contains a file/call ID used to access the file repository for retrieval of a corresponding data file from the file repository.

13. A computer readable medium comprising instructions that, when executed by a computer system, perform the method comprising:
  receiving individual frame messages representing calls from the mobile telephony network;
  packaging the individual frame messages as data files for storage in a file repository, and generating call data records (CDRs) corresponding to the calls for storage in a CDR repository, the CDRs including a summary of information included in respective ones of the data files;
  obtaining all CDRs associated with a particular call ID from the CDR repository, upon a request from a user, for initial data analysis;
  selecting one or more CDRs associated with the particular call ID for detailed data analysis; and
  obtaining detailed frame messages corresponding to one or more selected CDRs associated with the particular call ID from the file repository for detailed data analysis.

14. The computer readable medium as claimed in claim 13, wherein all CDRs associated with the particular call ID are obtained directly from the CDR repository, via a user input of defined call criteria.

15. The computer readable medium as claimed in claim 13, wherein all CDRs associated with the particular call ID are obtained automatically from the CDR repository, after the CDRs associated with the particular call ID have been filtered in advance, via user defined call criteria.

16. The computer readable medium as claimed in claim 13, wherein the user request is input, via a graphical user interface (GUI), to specify the type of calls for retrieval of all CDRs associated with the selected call ID from the CDR repository for initial signaling analysis and to request execution of a "drill-down" operation in which detailed frame messages corresponding to one or more selected CDRs are retrieved for detailed signaling analysis.

17. The computer readable medium as claimed in claim 13, wherein the data record generator packages individual frames that make up a call in a data file for storage in the file repository.

18. The computer readable medium as claimed in claim 13, wherein each CDR retrieved from the CDR repository contains a file/call ID used to access the file repository for retrieval of a corresponding data file from the file repository.

19. A computer readable medium having embodied thereon a program for execution by a host computer, said program comprising:
  a data record generator routine configured to receive an incoming data stream in a series of individual frames representing calls occurring on the mobile telephony network, to store the individual frames as data files in a file repository, and to generate call data records (CDRs) corresponding to the calls, the CDRs including a summary of information included in respective ones of the data files; and
  a call manager routine configured to manage the storage and retrieval of CDRs to/from a CDR repository, including user selection of CDRs of a specific type of calls and execution of a "drill-down" operation in which details of individual frames that make up a selected call can be drilled down from the file repository, upon request from a user input, for detailed data analysis.

20. The computer readable medium as claimed in claim 19, wherein the user input corresponds to a graphical user interface (GUI) which accepts inputs from the user to specify the type of calls for retrieval of all CDRs associated with the selected call from the CDR repository for initial signaling analysis and to request execution of the "drill-down" operation for a visual display of detailed frame messages corresponding to one or more selected CDRs for detailed signaling analysis.

21. The computer readable medium as claimed in claim 19, wherein the call manager routine is configured to function as a CDR filter mechanism for providing "real-time" filtering and matching of calls to user defined call criteria to select the type of calls that are of interest, and to function as a notification mechanism for providing notification and transportation to the CDR repository of triggered alarms and associated CDRs, when the calls occurring on the mobile telephone network match the user defined call criteria.

* * * * *